Patented Mar. 20, 1928.

1,663,004

UNITED STATES PATENT OFFICE.

J BIRCHARD GREEN, OF CHICAGO, ILLINOIS.

COATING FOR WELDING OR CUTTING RODS.

No Drawing.  Application filed January 22, 1927. Serial No. 162,933.

My invention relates to adhesives and the like when used for the purpose of binding fluxes or other desirable materials to wires or rods used for fusion welding or cutting. The object of my invention is to render available for this class of work those adhesives, cements, etc., which while effective at normal temperatures do not tend to hold the fluxes or other materials adherent to the rod or wire as it approaches and passes into the fusion zone.

I have discovered that by mixing with such adhesives, cements, etc., another substance which becomes pasty or sticky on heating, or by otherwise controlling the reactions of the total coating so that it, when heated during welding or cutting, becomes pasty or sticky, the fluxes or other materials can readily be carried up to, or into, the fusion zone, as is desired.

I have experimented with practically every known class of adhesive, and have found that the silicates of sodium or potassium are about the only ones which carry the fluxes in an entirely satisfactory manner, so far as their adherence to the rod is concerned, into the fusion zone. It so happens, however, that these silicates are often objectionable for other reasons, and hence other binders are needed. Oxides and other chemicals produce chemical reactions with these silicates, causing them to lose their adhesive properties, or produce reaction compounds not desired. These silicates are brittle and so cannot be used where flexibility is required. They are not entirely waterproof. They must be diluted with water in use, and this prevents employing anhydrous compounds—which readily take up water of crystallization—as part of the coating. While it is improbable that all of these objections would be met in any single case, one or more of them are met in very many cases.

I have discovered a way in which to make practically all adhesives, other than the silicates mentioned, suitable for use in binding materials on rods or wires for fusion welding and cutting, so that the most desirable adhesive for any particular case may be selected.

The classes of adhesives with which I have experimented are (1) the vegetable gums, dextrines, starches, etc., (2) the animal glues and gelatins, (3) the rosins, resins, drying oils, varnishes, gums, etc., (4) the cements and plasters, (5) the cellulose derivatives, (6) materials whose adhesive properties depend on their collodial condition, (7) rubber and rubber like gums, (8) caseins and (9) adhesive phosphoric acid. Among these classes of adhesives are those that are soluble in water, alcohol, acetone, gasoline, ether, carbon tetrachloride and, in fact, at least one of them can be mixed with most any solvent or with any material which might be desirable for the coating in a particular case. Also among these classes of adhesives will be found a wide range of other properties, such as brittle, tough, flexible—animal, vegetable and mineral—and many other equally self evident. In addition, many of the binders in these classes themselves also have an action on the fusion welding or cutting and in this respect serve the dual purpose of binder and an item in the coating.

None of these classes of binders tends under all conditions to carry the materials of the coating fully into the fusion zone. I have discovered that this can be done in a variety of ways and what I desire to patent is means for accomplishing it rather than any one or more particular means. With the variety of materials represented by these classes of binders, the same means could not reasonably be expected to apply in each instance so the following examples are to be considered illustrative but not taken as a complete statement of all the possible means.

I have discovered that many of the sodium compounds which I have experimented with give the desired action, making the coating pasty or sticky when heated. Among these compounds I might mention sodium hydroxide, the carbonates, metallates, of which there are several, etc. Most of these and similar compounds not only produce the pasty or sticky condition on heating but also influence the fusion welding or cutting and so can be made to serve a dual purpose. One concrete example will serve to illustrate this. By using dextrine as the binder on a flux coated ferrous electrode for fusion welding with the metallic arc, most any of the metallic oxides can successfully be incorporated in the coating, and sodium aluminate would be a suitable material—especially the impure salt containing some sodium hydroxide—to produce the pasty or sticky condition. Among the decomposition products of dextrine are carbon monoxide or dioxide, which seems to be liberated in just the correct quantity and at the correct point in reference to the fusion zone to at least materially assist in protecting the molten metal from damage by air contact in passing through the arc. Compounds of aluminum have the property of increasing the voltage drop across the arc and thus permit the release of a greater amount of energy as heat, increasing the penetration of the parent metal and accelerating the rate of melting of the electrode. Thus this combination of dextrine, metallic oxide or oxides, and sodium aluminate permits full play in the matter of using such oxides, which cannot be done with silicate of soda. The use of metallic oxides in turn permits a wide range of control both of arc operating characteristics and weld deposit properties, and within this wide range many remarkable results can be accomplished. At the same time, a possible dual function of both the binder and the material producing the pasty or sticky condition on heating is illustrated.

I claim:

1. A coating composition for welding or cutting rods, including a flux material, an adhesive material for holding the flux material on the rods at normal temperatures, and another material for carrying the flux material up to the fusion zone under temperatures higher than that at which the adhesive material becomes ineffective.

2. A coating composition for welding or cutting rods, including a material which upon entering the fusion zone will influence the welding or cutting operation, another material which at normal temperatures will hold the first mentioned material on the rod, and another material which at temperatures higher than that at which the second mentioned material becomes ineffective will carry the first mentioned material up to the fusion zone.

3. A coating composition for welding or cutting rods, including a material which upon entering the fusion zone will influence the welding or cutting operation, another material which at normal temperatures will hold the first mentioned material on the rod, and another material which at temperatures higher than that at which the second mentioned material becomes ineffective will become pasty or sticky and will carry the first mentioned material up to the fusion zone.

In testimony whereof I have hereunto subscribed my name.

J BIRCHARD GREEN.